US010493923B1

(12) United States Patent
Moburg et al.

(10) Patent No.: US 10,493,923 B1
(45) Date of Patent: Dec. 3, 2019

(54) VEHICLE SEAT HOOK ASSEMBLY

(71) Applicant: Honda Motor Co., Ltd., Tokyo (JP)

(72) Inventors: Frank D. Moburg, Orange, CA (US); Yuri A. Starik, Delaware, OH (US); Joan R. Smith, Plain City, OH (US); Andrew E. Barrow, Powell, OH (US); Jeffrey H. Scheurer, II, Columbus, OH (US); Adam M. Parker, Marysville, OH (US); Andrea S. Martin, Powell, OH (US); Samuel D. Goodrow, Chicago, IL (US)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 16/047,241

(22) Filed: Jul. 27, 2018

(51) Int. Cl.
    *B60R 7/10* (2006.01)
    *B60R 7/04* (2006.01)
    *B60N 2/809* (2018.01)

(52) U.S. Cl.
    CPC .............. *B60R 7/043* (2013.01); *B60N 2/809* (2018.02)

(58) Field of Classification Search
    CPC .................................. B60R 7/10; B60R 7/043
    See application file for complete search history.

(56) References Cited

U.S. PATENT DOCUMENTS

| 3,385,547 A * | 5/1968 | West | B60R 7/10 248/308 |
| 4,221,354 A * | 9/1980 | Kempkers | A47G 25/065 224/927 |
| 5,492,260 A * | 2/1996 | Rieden | B60R 7/10 224/313 |
| 5,791,614 A * | 8/1998 | Sims | B60R 7/10 224/275 |

(Continued)

FOREIGN PATENT DOCUMENTS

| DE | 19909879 | 9/1999 |
| KR | 19980034530 | 9/1998 |

(Continued)

OTHER PUBLICATIONS

Feature: 10 Things You Should Know About the Perodua Axia; https://www.autofreaks.com/2014/29469/feature-10-things-you-should-know-about-the-perodua-axia/; Sep. 18, 2014; pp. 1-14; autofreaks.com.

(Continued)

*Primary Examiner* — Shin H Kim
(74) *Attorney, Agent, or Firm* — Rankin, Hill & Clark LLP

(57) ABSTRACT

A vehicle seat having a vehicle seat hook assembly for hanging an associated object on the vehicle seat includes a seat back having a front side, a rear side, and an upper distal portion and a headrest moveably secured to the upper distal portion for movement between a headrest retracted position (Continued)

and a headrest extended position. A seat hook is disposed on the seat back and is moveable between a seat hook retracted or collapsed position and a seat hook extended or sprung position. Movement of the headrest from the headrest retracted position to the headrest extended position causes movement of the seat hook from the seat hook retracted position to the seat hook extended position and movement of the headrest from the headrest extended position to the headrest retracted position causes movement of the seat hook from the seat hook extended position to the seat hook retracted position.

20 Claims, 2 Drawing Sheets

(56) References Cited

U.S. PATENT DOCUMENTS

| | | | | |
|---|---|---|---|---|
| 6,457,690 | B1 * | 10/2002 | Spykerman | B60R 7/10 224/313 |
| 6,663,067 | B2 * | 12/2003 | Gordon | A47G 25/065 224/553 |
| 6,968,601 | B2 * | 11/2005 | Bivens | B60R 7/10 224/313 |
| 8,079,446 | B2 * | 12/2011 | Nemoto | B60R 7/10 185/40 H |
| 8,490,935 | B2 * | 7/2013 | Myers | B60R 7/10 248/289.11 |
| 8,550,417 | B2 * | 10/2013 | Lee | B60R 7/10 248/304 |
| 8,733,830 | B2 * | 5/2014 | Sanchez | B60N 2/838 297/188.03 |
| 8,820,597 | B2 * | 9/2014 | Huelke | B60R 7/10 224/311 |
| 9,365,164 | B2 | 6/2016 | Ackeret et al. | |
| 9,725,032 | B2 * | 8/2017 | Huelke | B60R 7/10 |
| 9,731,657 | B1 * | 8/2017 | Salter | B60R 7/043 |
| 10,065,565 | B2 * | 9/2018 | Mozurkewich | B60R 7/08 |
| 10,220,790 | B2 * | 3/2019 | Mozurkewich | B60R 7/10 |
| 10,363,880 | B1 * | 7/2019 | Miranda Nieto | B60R 7/043 |
| 2009/0250579 | A1 * | 10/2009 | Nishida | B60R 7/08 248/308 |
| 2012/0027410 | A1 | 11/2012 | Ackeret et al. | |
| 2013/0221712 | A1 * | 8/2013 | Sanchez | B60N 2/838 297/188.03 |

FOREIGN PATENT DOCUMENTS

| | | |
|---|---|---|
| KR | 19980039334 | 9/1998 |
| KR | 20060014707 | 2/2006 |
| KR | 100560691 | 3/2006 |
| KR | 100568677 | 4/2006 |
| WO | 2009112280 | 9/2009 |

OTHER PUBLICATIONS

Maruti Vitara Brezza seat hook First Drive Review; https://indianautosblog.com/2016/03/maruti-vitara-brezza-review-224349/maruti-vitara-brezza-seat-hook-first-drive-review; Mar. 12, 2016; pp. 1-3; Indian Autos Blog.

* cited by examiner

VEHICLE SEAT HOOK ASSEMBLY

BACKGROUND

Vehicle occupants, in particular vehicle drivers, often carry associated personal item objects, such as purses, when they travel in their vehicles. These personal item objects are often desired to be in close proximity to the vehicle occupant during vehicle travel. For example, the vehicle occupant may simply have a personal item object, such as a purse, resting on the passenger seat or on the vehicle floor adjacent a passenger seat. However, simply resting such an object in the vehicle cabin without securing of the object may result in the object tumbling over, such as during rapid breaking or acceleration of the vehicle, and possibly the contents held by the object spilling out.

It has been proposed to provide designated vehicle storage for such personal item objects, such as in the center console of the vehicle. However, some vehicle occupants prefer not to use designated storage for various reasons. This can include perceived lack of cleanliness within the designated storage compartment after the vehicle has been used for some time, wear on the personal item object from being put into and removed from the designated storage, lack of the designated storage being complementarily sized for the designated personal object, etc.

Attempting to address these concerns, many after-market accessories are known for providing a hanging device, such as a hook, which is attached to or suspended from a headrest on one of the vehicle seats. This can enable a personal item object, such as a purse, to be hung or suspended relative to the seat base via the hook device secured to the headrest. Drawbacks of such known devices are that they tend to be after-market devices that are often not user-friendly, not integrated into the vehicle styling, etc.

SUMMARY

According to one aspect, a vehicle seat having a vehicle seat hook assembly includes a seat back having a front side, a rear side, and an upper distal portion and a headrest moveably secured to the upper distal portion for movement between a headrest retracted position and a headrest extended position. A seat hook is disposed on the seat back and is moveable between a seat hook retracted position and a seat hook extended position. Movement of the headrest from the headrest retracted position to the headrest extended position causes movement of the seat hook from the seat hook retracted position to the seat hook extended position and movement of the headrest from the headrest extended position to the headrest retracted position causes movement of the seat hook from the seat hook extended position to the seat hook retracted position.

According to another aspect, a vehicle seat hook assembly for a vehicle seat includes a seat back, a headrest moveably mounted to the seat back at a distal upper portion thereof, and a seat hook disposed on the seat back below the headrest. The seat hook is bias toward a sprung position wherein the seat hook extends upward away from the seat back when the headrest is in a headrest extended position. The seat hook movable by the headrest away from the sprung position toward a collapsed position when the headrest is collapsed onto the seat back.

According to a further aspect, a vehicle seat hook assembly for hanging an associated object on a vehicle seat includes a seat hook disposed on a vehicle seat back at an upper distal portion of the vehicle seat back below a headrest of the seat back. The seat hook is movable between a seat hook retracted position and a seat hook extended position. Movement of the headrest from a headrest retracted position to a headrest extended position causes movement of the seat hook from the seat hook retracted position to the seat hook extended position and movement of the headrest from the headrest extended position causes movement of the seat hook from the seat hook extended position to the seat hook retracted position.

DETAILED DESCRIPTION

Figure 1:
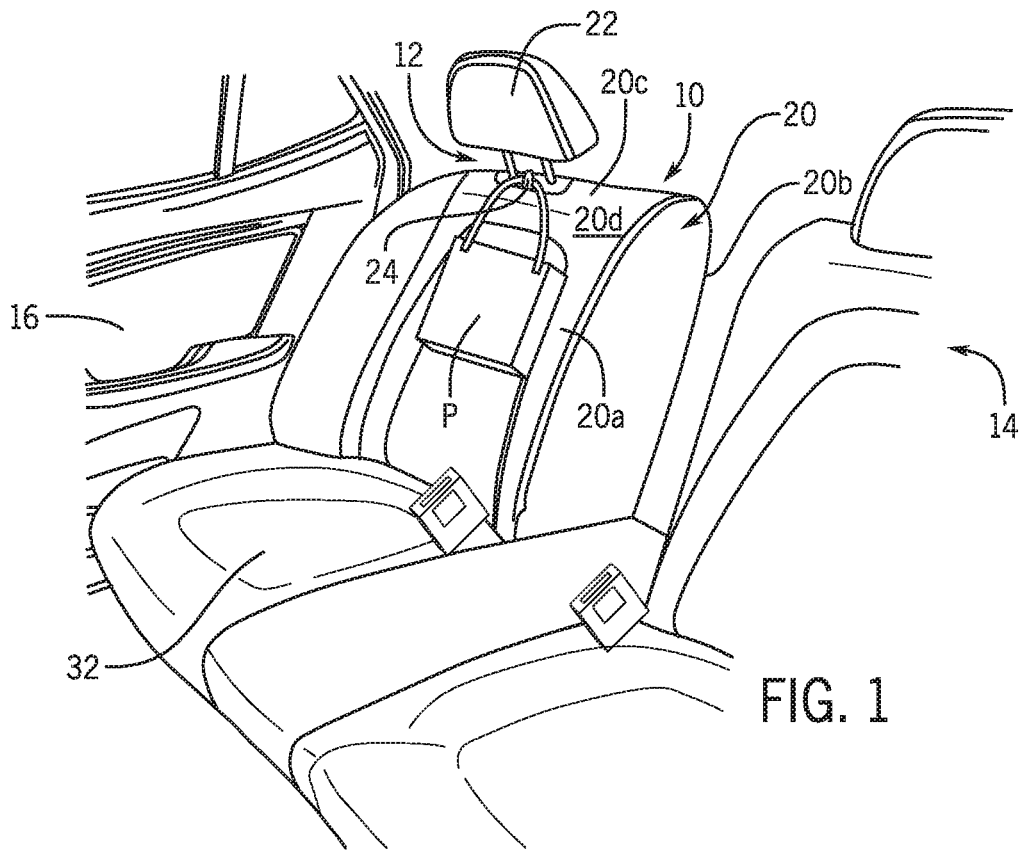
FIG. 1 schematically illustrates a set of side-by-side vehicle seats in a vehicle with at least one of the vehicle seats having a vehicle seat hook assembly according to an exemplary embodiment.

Referring to the drawings wherein the showings are for purposes of illustrating one or more exemplary embodiments and not for purposes of limiting the same, FIGS. 1-4 illustrate a vehicle seat 10 having a vehicle seat hook assembly 12 according to an exemplary embodiment that is provided for hanging an associated object or personal item object, such as illustrated purse P. In particular, in the illustrated embodiment, the vehicle seat 10 is provided as one of a pair of side-by-side vehicle seats 10, 14 both provided laterally adjacent to one another within a vehicle 16. Hereinbelow, only vehicle seat 10 will be discussed as having the vehicle seat hook assembly 12, though it is to be appreciated by those skilled in the art that the vehicle seat 14 could also be provided with a vehicle seat hook assembly the same or similar to the vehicle seat hook assembly 12 if desired.

In the illustrated embodiment, the vehicle seat hook assembly 12 and the vehicle seat 10 together include a seat back 20, a headrest 22 movably secured to the seat back 20, and a seat hook 24 disposed on the seat back 20 below the headrest 22. The seat back 20 has a front side 20a, a rear side 20b, and an upper distal portion 20c. The headrest 22 is movably mounted to the seat back 20 at the upper distal portion 20c thereof. More particularly, the headrest 22 is movably secured to the upper distal portion 20c for movement between a headrest retracted position (shown in FIG. 3) and a headrest extended position (shown in FIGS. 1, 2, and 4).

As will be described in more detail below, the seat hook 24 is bias toward a seat hook extended or sprung position (shown in FIGS. 1, 2, and 4) wherein the seat hook 24 extends upward away from the seat back 20 when the headrest 22 is in the headrest extended position. The seat hook 24 is movable by the headrest 22 away from the extended or sprung position toward a retracted or collapsed position when the headrest 22 is collapsed onto the seat back 20 (as shown in FIG. 3). More particularly, the seat hook 24 is movable between the seat hook retracted position, also referred to herein as the seat hook collapsed position, and a seat hook extended position, also referred to herein as a seat hook sprung position. Movement of the headrest 22 from the headrest retracted position to the headrest extended position causes movement of the seat hook 24 from the seat hook retracted position to the seat hook extended position and movement of the headrest 22 from the headrest extended position to the headrest retracted position causes movement of the seat hook 24 from the seat hook extended position to the seat hook retracted position.

The vehicle seat hook assembly 12 of the illustrated embodiment includes a spring mechanism 30 that biases the seat hook 24 toward the extended or sprung position and moves the seat hook 24 to the extended or sprung position when the headrest 22 is in the headrest extended position wherein the headrest 22 does not inhibit or prevent movement of the seat hook 24 to the seat hook extended position. More particularly, the spring mechanism 30 urges the seat hook 24 toward the seat hook sprung or extended position such that the headrest 22 being in the headrest extended position allows the spring mechanism 30 to move the seat hook 24 to the seat hook sprung or extended position and the headrest 22 being in the headrest retracted position prevents or inhibits the spring mechanism 30 from moving the seat hook 24 to the seat hook extended position.

Movement of the headrest 22 from the headrest extended position engages the seat hook 24 while in the seat hook extended position and moves the seat hook 24 from the seat hook extended position to the seat hook retracted position. More particularly, movement of the headrest 22 from the headrest extended position engages the seat hook 24 and moves the seat hook 24 against the urging of the spring mechanism 30 from the seat hook extended position to the seat hook retracted position. As best shown in FIG. 3, the seat hook 24 can be hidden from view, in full or part, when the headrest 22 is in the headrest retracted position thereby maintaining the seat hook 24 in the seat hook retracted position.

As shown in the illustrated embodiment, the spring mechanism 30 can be a coil spring having one leg 30*a* fixed relative to the seat back 20 and another leg 30*b* fixed relative to the seat hook 24 with the seat hook 24 pivotally mounted relative to the seat back 20 such that pivotal movement of the seat hook 24 to the seat hook retracted position loads or compresses the spring mechanism 30 to provide the biasing of the seat hook 24 toward the seat hook extended position. It is to be appreciated by those skilled in the art that other spring mechanisms could be used (e.g., the seat hook 24 could be formed as a resilient member that is biased toward the seat hook extended position).

Figure 2:
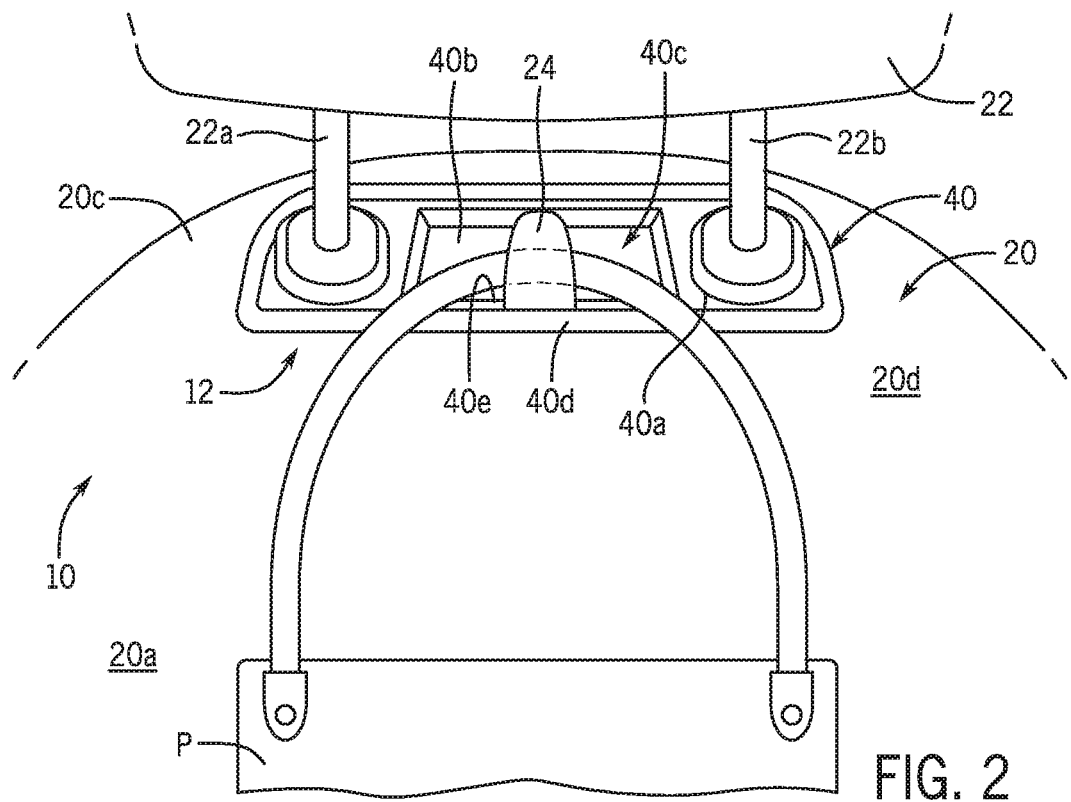
FIG. 2 is a partial forward elevation view of the vehicle seat having the vehicle seat hook assembly from FIG. 1 shown with a headrest of the vehicle seat in a headrest extended position and a seat hook of the seat hook assembly in a seat hook extended position.
Figure 3:
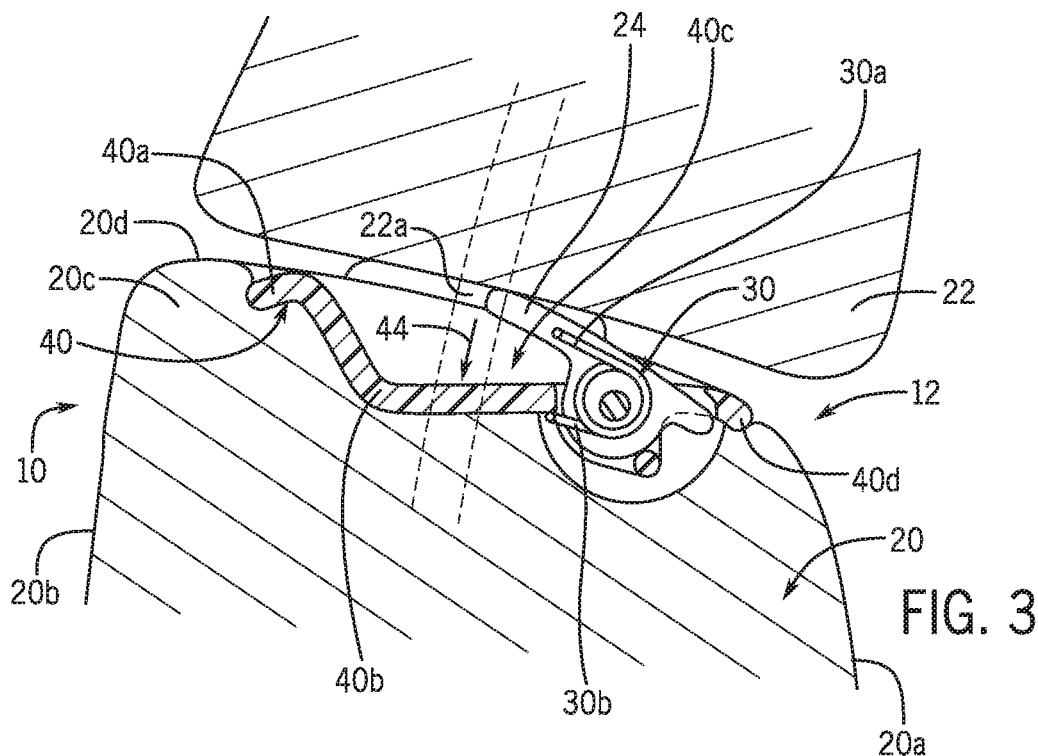
FIG. 3 is a schematic cross-section view of the vehicle seat of FIG. 2 shown with the headrest in a headrest retracted position and the seat hook in a seat hook retracted position.
Figure 4:
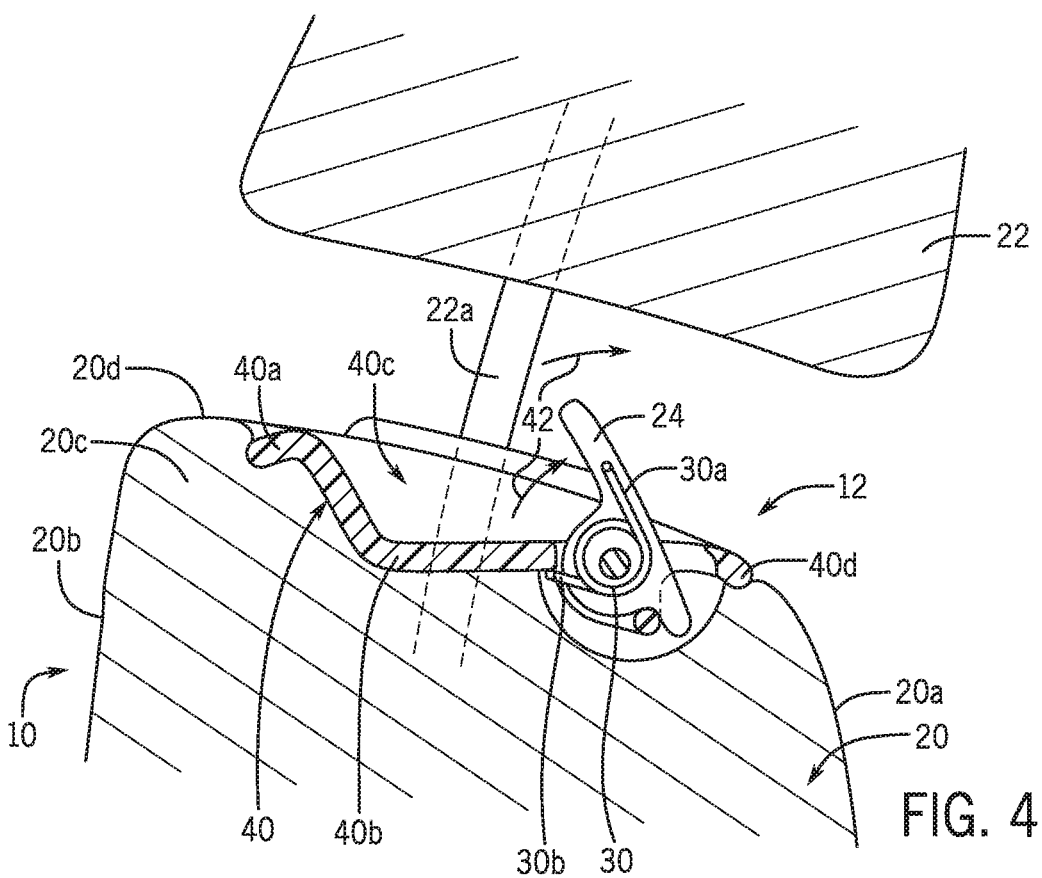
FIG. 4 is a cross-section view similar to FIG. 3 but showing the headrest in the headrest extended position and showing the seat hook in a seat hook extended position.

As shown in the illustrated embodiment, with the seat hook 24 in the seat hook extended or sprung position shown in FIGS. 1, 2, and 4, an object, such as the illustrated purse P, can be easily hung from the seat hook 24 as shown in FIGS. 1 and 2. This advantageously allows the purse P to be held in a suspended state relative to a seat base 32 of the vehicle seat 10 and inhibits tumbling over of the purse P during driving and also spilling out of the contents contained within the purse P. This also advantageously allows the purse P to be safely stowed or stored while being accessible to a vehicle occupant seated in the adjacent vehicle seat 14. Additionally, the foregoing provides an integrated solution wherein the vehicle seat hook assembly 12 is integrated into the vehicle seat 10 allowing for ease of use while allowing for a more styled appearance for the vehicle seat 10, such as when the vehicle seat hook assembly 12 is not being used.

As shown in the illustrated embodiment, the seat hook assembly 12 can further include a cap member 40 disposed on the seat back 20 below the headrest 22 and to which the seat hook 24 is pivotally secured. More particularly, in the illustrated embodiment, a seat hook 24 is movably secured, and specifically pivotally secured, to the cap member 40 for movement away from the cap member 40, as shown by arrow 42 in FIG. 4, when the seat hook 24 is moved from the seat hook retracted position to the seat hook extended position, and for movement toward the cap member 40, as shown by arrow 44 in FIG. 3, when the seat hook is moved from the seat hook extended position to the seat hook retracted position.

The cap member 40 can include a main portion 40*a* mounted over the seat back 20 and a recessed portion 40*b* extending downward from the main portion 40*a* into and through the seat back 20, or at least into and through a show or exposed surface 20*d* of the seat back 20. As shown, the recessed portion 40*b* can be arranged, at least in part, vertically below the seat hook 24 and defines a recessed space or recess 40*c*. In particular, the recessed portion 40*b* of the cap member 40 depends downward from the main portion 40*a* of the cap member 40 into the seat back 20 thereby defining the recess 40*c* which is disposed below the seat hook 24, at least when the seat hook 24 is in the seat hook retracted position.

Thus, the recessed portion 40*b* can protrude into the upper distal portion 20*c* of the seat back 20 below the exposed surface 20*d* of the seat back 20. The recessed portion 40*b*, and particularly at least a portion of the recess 40*c* defined thereby, is disposed immediately below the seat hook 24 when the seat hook 24 is in the seat hook extended position shown in FIG. 4 for enabling easier hooking of the associated object, for example the purse P, onto the seat hook 24 as shown in FIGS. 1 and 2. As best shown in FIG. 3, the cap member 40 together with the seat hook 24 can be generally or mostly hidden from view when the headrest 22 is in the headrest retracted position wherein the headrest 22 rests against or closely adjacent the upper distal portion 20*c* of the seat back 20.

In one embodiment, the cap member 40 is molded of a rigid material, such as a composite plastic, and is arranged such that the recessed portion 40*b* is disposed between mounting posts 22*a*, 22*b* of the headrest 22 that extend into the seat back 20. More specifically, the cap member 40 can be molded of a rigid material that is at least more rigid relative to the seat back 20, which can be a softer upholstered material, such as cloth, leatherette, leather, etc. As is known and understood by those skilled in the art, the mounting posts 22*a*, 22*b* of the headrest 22 movably secure the headrest 22 to the seat back 20 for relative movement of the headrest 22 in relation to the seat back 20. In the illustrated embodiment, as best shown in FIG. 2, the mounting posts 22*a*, 22*b* extend through the main portion 40*a* of the cap member 40.

The seat hook 24 can be pivotally mounted to the cap member 40 along a longitudinal side 40*d* of the cap member 40 and along a longitudinal side 40*e* of the recessed portion 40*b*. As shown, the seat hook 24 can have a longitudinal extent arranged in parallel with a direction of travel of the vehicle 16 in which the vehicle seat 10 is disposed. More specifically, the longitudinal extent of the seat hook can be generally perpendicularly arranged relative to a lateral dimension of the vehicle seat 10, and particularly of the seat back 20. Accordingly, by this arrangement, the seat hook 24 is pivotally connected to the upper distal portion 20*c* of the seat back 20 toward a front side 20*a* of the seat back 20 and has a longitudinal extent that extends toward the rear side 20b of the seat back 20 when the seat hook 24 is in the seat hook retracted position and extends generally upright as shown in FIG. 4 toward the headrest 22 when the seat hook 24 is in the seat hook extended position.

Advantageously, by this arrangement, the vehicle 16 is provided with more flexible and movable storage space. The seat hook 24 being integrated into the seat back 20 provides an easily accessible solution that maintains overall seat function for the vehicle seat 10 and styling for the vehicle 16. A further advantage is that the vehicle seat hook assembly 12 allows for an object, such as the illustrated purse P, to be secured and thereby have its contents secure therein (i.e., spilling over is inhibited), particularly while the vehicle 16 is in motion. A further advantage is that vehicle occupant access is easily provided for while the object is hung in a suspended state on the vehicle seat 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat having a vehicle seat hook assembly, comprising:
 a seat back having a front side, a rear side and an upper distal portion;
 a headrest movably secured to the upper distal portion for movement between a headrest retracted position and a headrest extended position; and
 a seat hook disposed on the seat back and moveable between a seat hook retracted position and a seat hook extended position, wherein movement of the headrest from the headrest retracted position to the headrest extended position causes movement of the seat hook from the seat hook retracted position to the seat hook extended position and movement of the headrest from the headrest extended position to the headrest retracted position causes movement of the seat hook from the seat hook extended position to the seat hook retracted position.

2. The vehicle seat having a vehicle seat hook assembly of claim 1 wherein movement of the headrest from the headrest extended position engages the seat hook and moves the seat hook from the seat hook extended position to the seat hook retracted position.

3. The vehicle seat having a vehicle seat hook assembly of claim 1 further including a spring mechanism that urges the seat hook toward the seat hook extended position such that the headrest being in the headrest extended position allows the spring mechanism to move the seat hook to the seat hook extended position and the headrest being in the headrest retracted position prevents the spring mechanism from moving the seat hook to the seat hook extended position.

4. The vehicle seat having a vehicle seat hook assembly of claim 3 wherein movement of the headrest from the headrest extended position engages the seat hook and moves the seat hook against the urging of the spring mechanism from the seat hook extended position to the seat hook retracted position.

5. The vehicle seat having a vehicle seat hook assembly of claim 1 further including a cap member disposed on the seat back below the headrest, the seat hook movably secured to the cap member for movement away from the cap member when the seat hook is moved toward the seat hook extended position and movement toward the cap member when the seat hook is moved toward the seat hook retracted position.

6. The vehicle seat having a vehicle seat hook assembly of claim 5 wherein the cap member includes a recessed portion protruding into the upper distal portion of the seat back below an exposed surface of the seat back, the recessed portion disposed immediately below the seat hook when the seat hook is in the seat hook extended position for enabling easier hooking of an associated object onto the seat hook.

7. The vehicle seat having a vehicle seat hook assembly of claim 5 wherein the cap member is molded of a rigid material that is rigid relative to the seat back.

8. The vehicle seat having a vehicle seat hook assembly of claim 6 wherein the recessed portion is disposed between mounting posts of the headrest that movably secure the headrest to the seat back.

9. The vehicle seat having a vehicle seat hook assembly of claim 8 wherein the mounting posts extend through a main portion of the cap member, the recessed portion of the cap member depending from the main portion of the cap member into the seat back.

10. The vehicle seat having a vehicle seat hook assembly of claim 9 wherein the seat hook is pivotally mounted to the cap member along a longitudinal side of the cap member and along a longitudinal side of the recessed portion.

11. The vehicle seat having a vehicle seat hook assembly of claim 5 wherein the cap member is hidden from view when the headrest is in the headrest retracted position.

12. The vehicle seat having a vehicle seat hook assembly of claim 1 wherein the seat hook is pivotally connected to the distal portion of the seat back toward the front side of the seat back and has a longitudinal extent that extends toward the rear side of the seat back when the seat hook is in the seat hook retracted position and extends upright toward the headrest when the seat hook is in the seat hook extended position.

13. A vehicle seat hook assembly for a vehicle seat, comprising:
 a seat back;
 a headrest movably mounted to the seat back at an upper distal portion thereof; and
 a seat hook disposed on the seat back below the headrest, the seat hook biased toward a sprung position wherein the seat hook extends upward away from the seat back when the headrest is in a headrest extended position, the seat hook movable by the headrest away from the sprung position toward a collapsed position when the headrest is collapsed onto the seat back.

14. The vehicle seat hook assembly of claim 13 further including a spring mechanism that biases the seat hook toward the sprung position and moves the seat hook to the sprung position when the headrest is in the headrest extended position wherein the headrest does not inhibit biasing.

15. The vehicle seat hook assembly of claim 13 further including a cap member disposed on the seat back below the headrest and to which the seat hook is pivotally secured.

16. The vehicle seat hook assembly of claim 15 wherein the cap member includes a main portion mounted over the seat back and a recessed portion extending downward from the main portion into and through the seat back, the recessed portion arranged vertically below the seat hook.

17. The vehicle seat hook assembly of claim 16 wherein the cap member is molded of a rigid material and is arranged such that the recessed portion is disposed between mounting posts of the headrest that extend into the seat back.

18. The vehicle seat hook assembly of claim 13 wherein the seat hook has a longitudinal extent arranged in parallel with a direction of travel of a vehicle in which the vehicle seat is disposed.

19. A vehicle seat hook assembly for hanging an associated object on a vehicle seat, comprising:
   a seat hook disposed on the vehicle seat back at an upper distal portion of the vehicle seat back below a headrest of the seat back, the seat hook moveable between a seat hook retracted position and a seat hook extended position, wherein movement of the headrest from a headrest retracted position to a headrest extended position causes movement of the seat hook from the seat hook retracted position to the seat hook extended position and movement of the headrest from the headrest extended position causes movement of the seat hook from the seat hook extended position to the seat hook retracted position.

20. The vehicle seat hook assembly of claim 19 further including a spring mechanism that moves the seat hook to the seat hook extended position when the headrest does not prevent such movement of the seat hook.

\* \* \* \* \*